United States Patent [19]

Suzuki et al.

[11] Patent Number: 4,929,859

[45] Date of Patent: May 29, 1990

[54] PIEZOELECTRIC ACTUATOR HAVING PARALLEL ARRANGEMENT OF A SINGLE PIEZOELECTRIC ELEMENT AND A PAIR OF DISPLACEMENT MAGNIFICATION ARMS

[75] Inventors: Toshitake Suzuki, Susono; Norio Komoda, Gotenba; Susumu Oda, Toyota; Motoo Harata, Nagoya, all of Japan

[73] Assignee: Toyota Jidosha Kabushiki Kaisha, Aichi, Japan

[21] Appl. No.: 283,386

[22] Filed: Dec. 12, 1988

[30] Foreign Application Priority Data

Dec. 25, 1987 [JP] Japan .................. 62-328644
Dec. 25, 1987 [JP] Japan .................. 62-197229
Dec. 25, 1987 [JP] Japan .................. 62-197230

[51] Int. Cl.⁵ .......................................... H01L 41/08
[52] U.S. Cl. .................................................. 310/328
[58] Field of Search .................................... 310/328

[56] References Cited

U.S. PATENT DOCUMENTS

| 4,193,703 | 3/1980 | Sakmann ............... 310/328 X |
| 4,408,832 | 10/1983 | Hartman et al. ........ 310/328 X |
| 4,423,347 | 12/1983 | Kleinschmidt et al. ... 310/328 X |
| 4,435,666 | 3/1984 | Fukui et al. ............ 310/328 |
| 4,460,842 | 7/1984 | Waanders et al. ....... 310/328 X |
| 4,506,154 | 3/1985 | Scire .................... 310/328 X |
| 4,547,086 | 10/1985 | Matsumoto et al. ..... 310/328 X |
| 4,570,095 | 2/1986 | Uchikawa .............. 310/328 |
| 4,690,465 | 9/1987 | Takeda et al. .......... 310/328 X |
| 4,703,215 | 10/1987 | Asano .................. 310/328 |
| 4,736,131 | 4/1988 | Fujimoto ............... 310/328 |
| 4,769,569 | 9/1988 | Stahlhuth .............. 310/328 |
| 4,771,204 | 9/1988 | Siegel .................. 310/328 X |

FOREIGN PATENT DOCUMENTS

| 0237868 | 11/1985 | Japan ................. 310/328 |
| 44080 | 3/1986 | Japan . |
| 50448 | 4/1986 | Japan . |
| 103679 | 7/1986 | Japan . |
| 0134983 | 6/1987 | Japan ................. 310/328 |

Primary Examiner—Mark O. Budd
Attorney, Agent, or Firm—Oliff & Berridge

[57] ABSTRACT

A linear expansion or contraction of a piezoelectric element (150) is converted into a corresponding magnified linear movement of an output member (120) along a central axis (34) by a series combination of a pair of magnifying lever arms (100, 102) supported from a retainer structure (52) via a pair of elastic integral hinges (96, 98) and a pair of links (110, 112; 206, 208) wherein the retainer structure is enclosed in a housing (38) and adjustably fastened thereto so as to be adjustably shiftable relative thereto along the central axis.

16 Claims, 7 Drawing Sheets

PIEZOELECTRIC ACTUATOR HAVING PARALLEL ARRANGEMENT OF A SINGLE PIEZOELECTRIC ELEMENT AND A PAIR OF DISPLACEMENT MAGNIFICATION ARMS

BACKGROUND OF THE INVENTION

1. Field of the Invention

The present invention relates to an actuator, and more specifically relates to a piezoelectric actuator suitable for use as an actuator of for example a hydraulic servo valve.

2. Description of the Prior Art

A linear motor has conventionally been used as the actuator for a high response hydraulic servo valve, wherein the valve spool is driven linearly by the linear motor. Further, in order to obtain a higher speed operation of the servo valve etc., a single stage magnification type piezoelectric actuator has already been proposed, incorporating a laminated piezoelectric element, and a displacement magnification mechanism which enlarges a very small displacement of a piezoelectric element by a lever effect. In order further to increase the output displacement of the actuator, and to make the driving of a driven member even faster, a piezoelectric actuator including a two-stage displacement magnification mechanism was proposed, as described in for example Japanese Utility Model Laying-Open Publication Sho 61-44080 (1986) or Japanese Utility Model Laying-Open Publication Sho 61-103679 (1986).

However, in the construction described in Japanese Utility Model Laying-Open Publication Sho 61-44080 (1986), the second stage of the displacement magnification is carried out hydraulically by using a nozzle and a flapper, and therefore there is the problem that the response is poor. Further, in the embodiments shown in FIG. 1 and FIG. 5 in that publication, two piezoelectric elements are used to operate in mutually opposite directions. Therefore, in that construction, unless the control signals to the two piezoelectric elements are controlled accurately and with an appropriate relative timing, the actuator will not operate appropriately and accurately. In the construction described in Japanese Utility Model Laying-Open Publication Sho 61-103679 (1986), in the first stage of displacement magnification mechanism, a lever construction is used in which a lever comes into contact with the fulcrum, and since the output displacement of the piezoelectric element is extremely small, and when the lever begins to pivot about the fulcrum there is a certain amount of play between the two, it is not possible for the first stage of the displacement magnification to be carried out accurately, and therefore it is difficult to ensure that the driven member is accurately driven and positioned.

In Japanese Utility Model Laying-Open Publication Sho 61-50448 (1986) there is described a print hammer in which the first stage displacement magnification mechanism is a lever mechanism with an elastic hinge as the fulcrum, and the second displacement magnification mechanism uses an elastic deformation of a spring; thus the printing pin can be driven at high speed according to an electrical control signal supplied to the piezoelectric element. In this print hammer, however, unless the leaf spring constant is increased, the resonance point is low, while if the leaf spring constant is increased, the lever arms of the first displacement magnification mechanism will be pushed apart, and therefore an accurate and smooth operation will no longer be obtained. Further, since the second stage of the displacement magnification is carried out by elastic deformation of a leaf spring, positioning of the driven member coupled to it cannot be carried out accurately, and therefore if this construction is applied to an actuator, the driving and positioning of the driven member cannot be carried out with both high accuracy and good response.

SUMMARY OF THE INVENTION

The present invention considers the above described problems in the conventional piezoelectric actuators, and has as its object the provision of a piezoelectric actuator which allows driving and positioning of a driven member to be carried out with high accuracy and good response, and which is moreover compact, inexpensive and superior in durability.

The above-mentioned object is accomplished according to the present invention by a piezoelectric actuator comprising an output member to reciprocate along a central axis, a piezoelectric element aligned substantially along said central axis, a retainer structure supporting a first end of said piezoelectric element, a first displacement magnification mechanism having a pair of arms each having a first end and a second end and pivotably supported on said retainer structure at an intermediate portion thereof via an elastic integral hinge, said first ends of said arms each abutting a second end of said piezoelectric element opposite to said first end thereof, and a second displacement magnification mechanism having a pair of links pivotably connected at first ends thereof respectively with said second ends of said arms and pivotably connected with said output member at second ends thereof opposite to said first ends thereof.

In the above mentioned structure of the piezoelectric actuator, said arms may extend substantially along said piezoelectric element. Further, said pair of arms and said pair of links may desirably be disposed substantially mutually symmetrically about said central axis.

Further, said pair of links may be connected with said arms by pivots. Alternatively, said pair of links may be connected with said arms by elastic integral hinges.

In a embodiment of the above-mentioned piezoelectric actuator each of said links may expand an acute angle between a longitudinal center line thereof and said central axis on one side thereof facing toward said piezoelectric element. Alternatively, each of said links may expand an acute angle between a longitudinal center line thereof and said central axis on one side thereof facing away from said piezoelectric element.

The above-mentioned pair of links may be pivotably supported at intermediate portions thereof from said retainer structure, said intermediate portions being displaced for an axial arm length from the pivotal connections between said second ends of said arms and said first ends of said links in a direction parallel to said central axis and for a transverse arm length larger than said axial arm length from the pivotal connections between said second ends of said links and said output member in a direction perpendicular to said central axis. In this case, said links may be pivotably supported from said retainer structure at said intermediate portions via integral elastic hinges. Further, said pair of links may be pivotably connected at said second ends thereof with a common integral element via integral elastic hinges, said common integral element forming a part of said output member.

The above-mentioned first displacement magnification mechanism may comprise an integral yoke member having a base portion of a generally U-shape having opposite leg portions arranged symmetrically on opposite sides of said central axis, a pair of arm portions extending symmetrically on opposite sides of said central axis substantially in parallel thereto to have first and second end portions expanding an effective arm length therebetween and integrally connected at said first end portions thereof with transversely innermost edge portions of axial end portions of said leg portions of said base portion via a pair of first integral elastic hinge portions, and a movable stay portion generally positioned between said two leg portions of said base portion and integrally connected with said first end portions of said arm portions via a pair of second integral elastic hinge portions displaced from said first pair of integral elastic hinge portions for a distance much smaller than said effective arm length toward said central axis and adapted to support said second axial end of said piezoelectric element.

In such a structure, said yoke member may have a generally U-shaped longitudinal section as a whole when viewed in a phantom plane extending along said central axis with said base portion and said first end portions of said pair of arm portions being separated by a pair of slits cut transversely from opposite side edges of said generally U-shaped longitudinal section inwardly toward said central axis so far as to leave said pair of first integral elastic hinge portions and with said base portion and said movable stay portion being separated by a slit of a generally U-shape when viewed in said phantom plane, opposite end portions of said generally U-shaped slit defining said first and second integral elastic hinge portions on opposite sides thereof. In this case, said opposite ends of said generally U-shaped slit may desirably extend beyond said pair of transverse slits with regard to axial positions thereof along said central axis.

Further, said retainer structure may comprise a bifurcated retainer member including a root portion and a pair of leg portions extending therefrom, said retainer member supporting said first end of said piezoelectric element at said root portion thereof and being firmly clamped at tip end portions of said pair of leg portions thereof with said base portion of said yoke member, said pair of leg portions thereof being angularly displaced relative to said pair of arm portions of said yoke member about said central axis so that said leg portions of said retainer member and said arm portions of said yoke member extend alternately about said piezoelectric element.

The piezoelectric actuator according to the above structure may further comprise a substantially cylindrical housing having a longitudinal axis and enclosing said yoke member and said retainer member therein, and a means for adjustably fastening said yoke member to said housing along said longitudinal axis thereof. In such a structure, the piezoelectric actuator may further comprise a means for angularly anchoring said yoke member relative to said housing so as not to rotate in said housing relative thereto while allowing an axial adjust movement of said yoke member relative to said housing. Further, said means for adjustably fastening said yoke member to said housing may include a shaft portion extended from said root portion of said yoke member with a male thread formed therearound, a nut removably mounted to an open end portion of said cylindrical housing with a female thread thereof engaging with a corresponding male thread formed on an outer surface portion of said open end portion of said housing, a disk member having an outer rim portion adapted to be clamped between an end face of said open end portion of said housing and said nut and a central hub portion formed with a threaded opening to engage with said male thread of said shaft portion, and a lock nut mounted on said male shaft portion to be clamped against said hub portion for locking up relative rotation between said disk member and said shaft portion.

BRIEF DESCRIPTION OF THE DRAWINGS

In the accompanying drawings.

DESCRIPTION OF THE PREFERRED EMBODIMENTS

Figure 1:
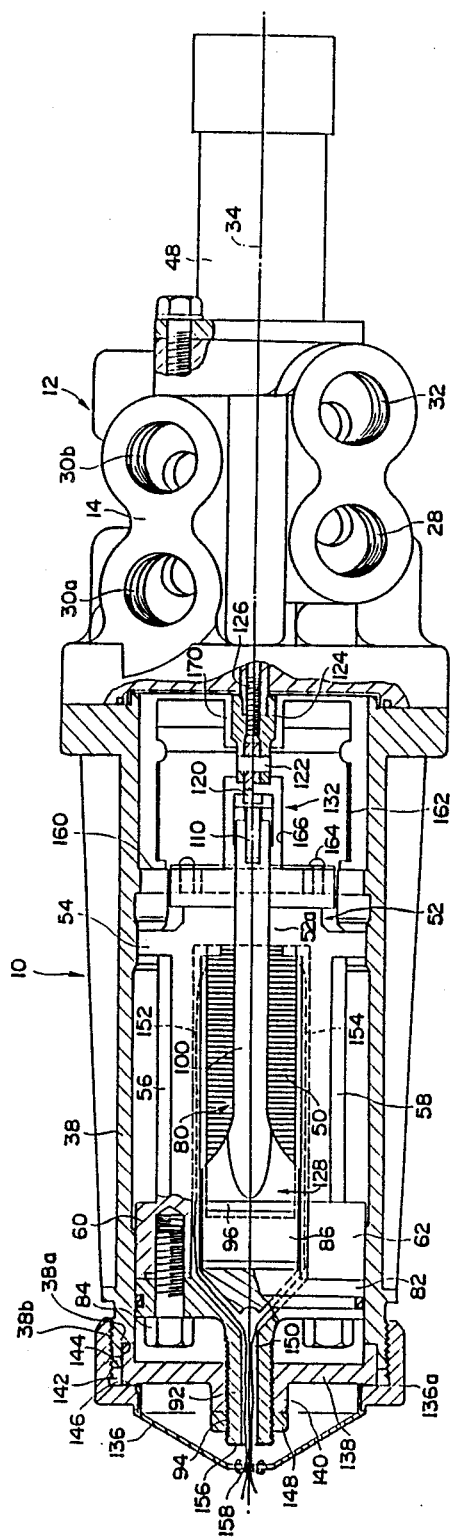
FIG. 1 and FIG. 2 are schematic longitudinal plan and vertical sectional views, respectively, showing an embodiment of the piezoelectric actuator according to the present invention applied to a hydraulic servo valve.

The present invention will now be described with respect to some preferred embodiments with reference to the accompanying drawings.

Referring to FIGS. 1 to 6, a piezoelectric actuator generally indicated by 10 is combined with a spool valve 12 to be controlled by the piezoelectric actuator. The spool valve 12 includes a valve housing 14, within which is inserted a sleeve 16. The housing 14 and the sleeve 16 cooperate to form a hydraulic pressure supply passage 18, output passages 20 and 22, and return passages 24 and 26. Although not shown in detail in the drawing, these passages are connected respectively with ports 28, 30a, 30b and 32. Within the sleeve 16, a spool 36 is inserted as a valve element so as to be reciprocatingly movable along a central axis 34, and as the spool moves along the central axis the flow direction and the flow amount of the operating fluid are controlled.

The valve housing 14 is at one end thereof coupled with one axial end of an actuator housing 38 by bolts 40. The valve housing 14 also has passages 42 and 44 which are in communication with the passages 24 and 26, respectively, and these passages 42 and 44 are in communication with the interior of the actuator housing 38. The other end of the valve housing 14 is coupled with a housing 48 which contains therein a sensor 46 which detects the position of the spool 36 and outputs a signal indicating the position of the spool to a feedback type control device not shown in the drawing.

Figure 4:
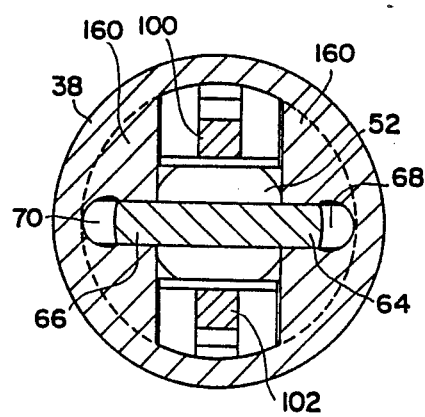

A piezoelectric element 50 is disposed within the housing 38 along the central axis 34 so that the relative displacement between the opposite ends thereof is produced substantially along the central axis 34. A retainer member 52 having a generally bifurated structure as will be understood hereinunder is provided as substantially symmetrically arranged about the central axis 34, and one end 50a of the piezoelectric element 50 abuts a support portion 52a of the retainer member 52 to be supported thereby. The support portion 52a is a central portion of a flange shaped root portion 54 forming the common root portion of the bifurcated structure of the retainer member 52, the outer peripheral surface of the root portion 54 being slidably received in a corresponding inside surface of the housing 38 so as to be reciprocatingly movable relative to the housing 38 along the central axis 34. The retainer member has also a pair of leg portions 56 and 58 extending leftward as viewed in FIGS. 1 and 2 from the root portion 54 as arranged symmetrically with respect to the central axis 34, ending in enlarged mounting portions 60 and 62, respectively. The diametrically opposite outer surfaces of the mounting portions 60 and 62 with respect to the central axis 34 are formed in a cylindrical configuration adapted to meet with a corresponding cylindrical inner surface portion of the housing 38 so as to be received thereby and reciprocatingly movable relative to the housing 38 along the central axis 34. From the root portion 54 there is rightwardly extended as viewed in FIGS. 1 and 2 a planar extension having diametrically opposite ends 64 and 66, as shown in FIG. 4, which are slidably received in corresponding grooves 68 and 70 formed in a pair of inwardly extended wall portions 160 of the housing 38, respectively; the retainer member 52 is thereby prevented from rotating relative to the housing 38 about the central axis 34.

Figure 2:
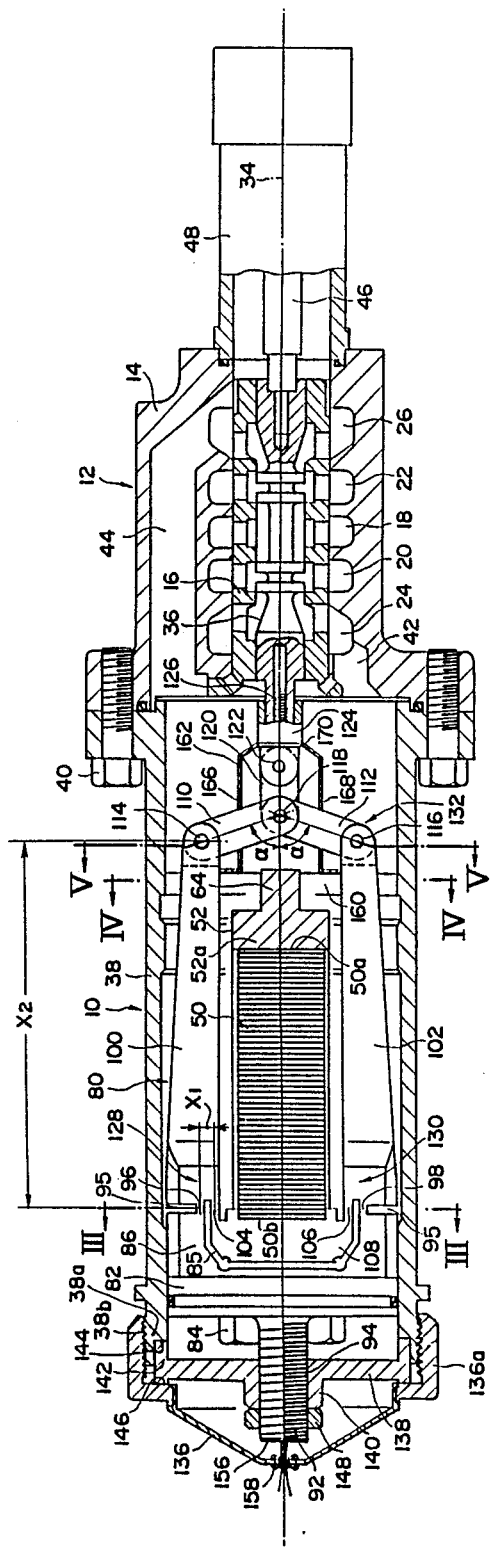
Figure 3:
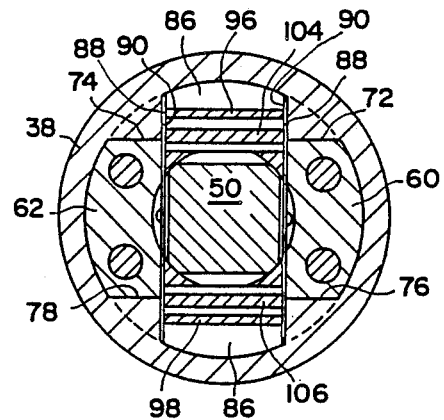
FIGS. 3, 4 and 5 are cross sections along lines III—III, IV—IV and V—V in FIG. 2, respectively.

The mounting portions 60 and 62 of the retainer member 52 are connected with a disk shaped root portion 82 of a yoke member 80 which also has a generally bifurcated structure in which a pair of arm portions 100 and 102 extend from the root portion 82 rightwardly as viewed in FIGS. 1 and 2, the connection between the mounting portions 60 and 62 and the root portion 82 being effected by bolts 84. The yoke member 80 has a base portion 86 formed integrally with the disk shaped root portion 82 to provide a base for supporting the arm portions 100 and 102, the base portion 86 having opposite flat side surfaces 88 (FIG. 3) confronting corresponding opposite inside wall surfaces 90 of the housing so that the rotation of the yoke member 80 relative to the housing 38 about the central axis 34 is also hereby prevented. A shaft 92 is also formed integrally with the root portion 82 to project axially from the root portion 82 in the direction opposite to the retainer member, and is formed with a male screw thread 94 therearound.

The base portion 86 supports the pair of arm portions 100 and 102 separated therefrom by slits 95 transversely cut into the yoke member from the corresponding opposite side wall portions thereof to leave integral elastic hinges 96 and 98 via these integral elastic hinges as disposed substantially in parallel with and symmetrically about the central axis 34 and angularly spaced by substantially 90° about the central axis 34 relative to the leg portions 56 and 58 of the retainer member 52. The root ends portions of the arm portions 100 and 102 support via integral elastic hinges 104 and 106 a movable stay portion 108 separated from the base portion 86 by a generally U-shaped slit 85 for supporting the piezoelectric element at the other end 50b thereof. The integral elastic hinges 104 and 106 are defined by the slit 85 on one side thereof. The slit 85 extends beyond the transverse slits 95 rightward as viewed in FIG. 2. By this arrangement the flexibility of the elastic integral hinge portions 96 and 8 is improved. The slit 85 is formed to have a width enough to allow the movable stay portion 108 to move without interfering with the base portion 86 when it moves relative to the base portion according to the expansion or contraction of the piezoelectric element. The arm portions 100 and 102 are of a tapered shape as seen in FIG. 2 so that, when they swing within a certain angular range about the respective integral elastic hinges 96 and 98, there is no interference with the housing 38.

By the arm portions 100 and 102 being positioned substantially 90° displaced about the central axis relative to the leg portions 56 and 58 of the retainer member 52, the dimensions along and orthogonal to the central axis 34 are, as a whole, substantially rationalized. It should be noted that the angular displacement between said arm portions and the leg portions may be other than 90°, but it is preferable for the reasons of balance of forces acting on the concerned members that the angle is substantially 90°.

The tip end portions of the arm portions 100 and 102 have each a two-pronged fork shape, and are pivotably connected with one of the ends of links 110 and 112 by pivots 114 and 116, respectively. The other ends of these links are pivotably attached to each other by a pivot 118, and are pivotably coupled to one end of an output member 120 which extends substantially along the central axis 34. The output member 120 is pivotably coupled to one end of a connecting member 124 by a pivot 122, and the other end of the connecting member 124 is connected with the spool 36 by a bolt 126. In the shown embodiment, the axes of the pivots 118 and 122 intersect the central axis 34. The links 110 and 112 are inclined in the direction to be away from the piezoelectric element from one end thereof connected with the arm portions 100 and 102 toward the other end thereof connected with the output member 120, so that the longitudinal center line expanded between the center of the pivot 114 alternatively 116 and that of the pivot 118 makes an angle a between 45° and 90° on the side thereof facing the piezoelectric element 50 with respect to the central axis 34.

The yoke member 80 provides a pair of first displacement magnification mechanisms generally designated by 128 and 130 which convert with magnification an axial displacement of the second end 50b of the piezoelectric element 50 relative to the root portion 82 into a corresponding mutually approaching or departing movement of the tip ends of the arm portions 100 and 102 in the directions perpendicular to the central axis 34. Denoting the effective arm length between the integral elastic hinges 96 and 98 and the integral elastic hinges 104 and 106, respectively, as X1, and the effective arm length of the arm portions 100 and 102 as X2, then said first displacement magnification mechanisms multiply said relative displacement of the end 50b of the piezoelectric element 50 by a factor of X2/X1.

The pair of links 110 and 112 are driven at the outer ends thereof pivoted with the tip ends of the arm portions 100 and 102 in the direction either toward or away from the central axis 34, and according to this the inner mutually pivoted ends thereof are driven along the central axis 34. This link mechanism forms a second displacement magnification mechanism generally designated by 132 of a type of inverse toggle link which causes the output member 120 to reciprocate along the central axis 34; this second displacement magnification mechanism converts the displacement of the tip ends of the arm portions 100 and 102 substantially perpendicular to the central axis 34 into a movement of the output member 120 along the central axis 34 by a magnification factor of tan a.

The left end portion 38a of the housing 38 as viewed in FIGS. 1 and 2 is formed with a male screw 38b on the outer peripheral surface thereof, and a nut 136a is threaded onto the male thread 38b. The nut 136a supports a cap member 136. The cap member is mounted to the nut as snappingly pressed thereinto to be removable when required. A disk member 138 is disposed between the nut 136a and the end portion 38a of the housing 38 with an annular peripheral rim portion 142 thereof being clamped between a couterbouce portion 144 of the end portion 38a and an annular end face 146 of the nut 136a. This disk member 138 has a central hub portion 140 formed with a female thread engaged with the male thread 94 on the shaft 92. A lock nut 148 is provided for fastening a certain relative position between the shaft 92 and the hub portion 140 as will be described hereinunder.

The yoke member 80 is formed with through passages 150, through which electric lead wire 152 and 154 for supplying an electric current to the piezoelectric element 50 extend. A seal 156 is provided as adhered onto the end face of the shaft portion 92 through which the lead wires extend. Further, a grommet 158 is provided at a central portion of the cap member 136 for conducting the lead wires therethrough.

When the retainer member 52 and the yoke member 80 are assembled together by the enlarged mounting portions 60 and 62 of the retainer member 52 being fastened to the root portion 82 of the yoke member 80 by the bolts 84 with the piezoelectric element 50 interposed therebetween, the piezoelectric element is subject to a certain preloading; then by controlling the electric current supplied to the piezoelectric element through the leads wires 152 and 154, the length of the piezoelectric element along the central axis 34 is varied.

Figure 5:
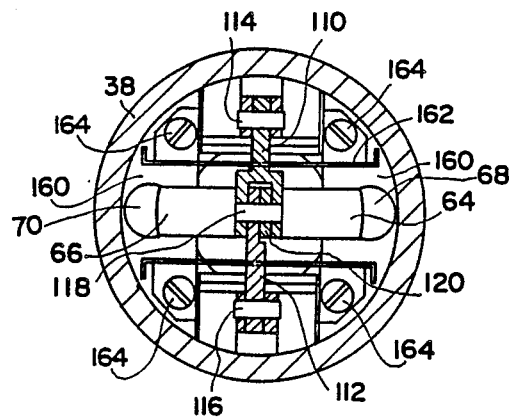
Figure 6:
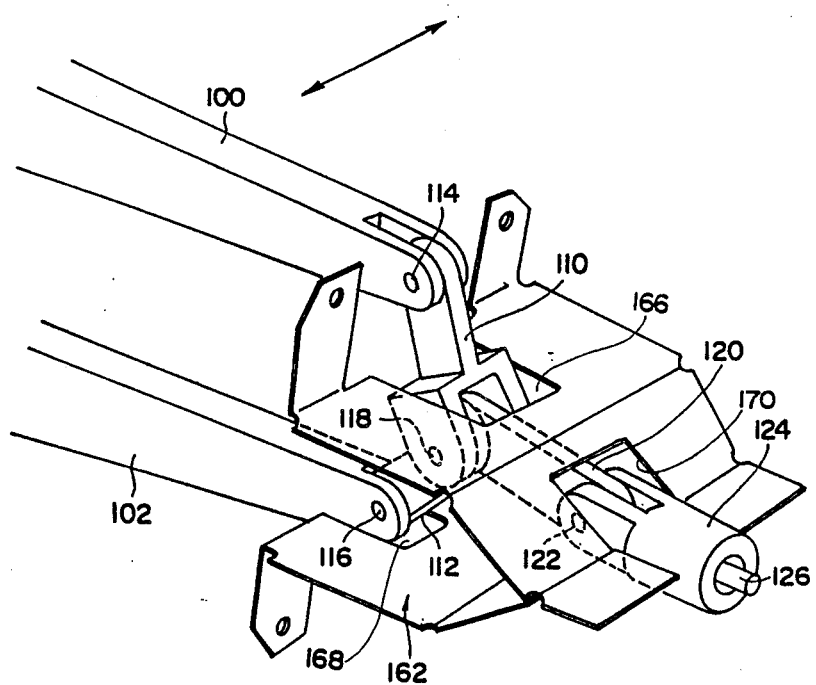
FIG. 6 is a perspective view showing a second displacement magnification mechanism in the embodiment shown in FIGS. 1 to 5 with a fluid flow separator.

A fluid flow separator 162 as shown in a perspective view in FIG. 6 is fixed to the pair of internal wall projections 160 by machine screws 164 (FIG. 5). The fluid flow separator 162 has apertures 166 and 168 for passing the links 110 and 112 without interference therethrough, and has also an aperture 170 for passing the connecting member 124 without interference therethrough. The fluid flow separator restricts the flow of operating fluid entering the housing 38 via the passage 42 from flowing directly to the passage 44, and thereby ensures that the operating fluid flows in contact with the piezoelectric element so as to cool it.

In operation, a control electric current is supplied to the piezoelectric element 50 through the lead wires 152 and 154 from a control device not shown in the figure, so that the piezoelectric element expands or contracts along the central axis 34 in accordance with changes of a electric field applied thereto by the electric current. Since the right side end 50a as viewed in FIGS. 1 and 2 of the piezoelectric element 50 is firmly supported relative to the root portion 82 of the yoke member 80 by the retainer member 52, the difference in the length of the piezoelectric element causes a corresponding displacement of the left side end 50b of the piezoelectric element relative to the root portion 82. Therefore, this relative displacement along the central axis 34 of the left end of the piezoelectric element causes a corresponding displacement of the movable stay portion 108 relative to the base portion 86, and therefore this displacement is converted into a corresponding angular movement of the arm portions 100 and 102 about the integral elastic hinges 96 and 98 so that the tip ends thereof move in a direction substantially perpendicular to the central axis 34 for a distance corresponding to X2/X1 times the axial displacement of the movable stay portion 108. Then the displacements of the tip ends of the arm portions 100 and 102 are converted into the axial movement of the output member 120 via the inverse toggle link mechanism 132 at the magnification ratio of tan a; the axial movement if further transmitted through the connecting member 124 and the bolt 126 to the spool 36; thus the direction and rate of the flow of operating fluid through the valve 12 are controlled. The position of the spool 36 is detected by the sensor 46, and a feedback control of the actuator is done by a control device not shown in the figure based upon the output signal from this sensor.

In the embodiment shown in FIGS. 1-6, the neutral position of the output member 120 and therefore of the spool 36 of the valve 12 can be easily adjusted. First the cap member 136 is removed and the nut 136a and the nut 148 are loosened so that the disk member 138 can rotate about the shaft 92. The disk member 183 is prevented from moving in the axial direction by the rim portion 142 thereof being axially held between the end face 144 of the housing 38 and the opposing face 146 of the nut 136a. Therefore, as the disk member 138 is turned the shaft 92 is displaced along the central axis 34 relative to the disk, and therefore the yoke member 80, the retainer member 52, the links 110 and 112, the output member 120, the connecting member 124 and the spool 36 are moved as a whole along the central axis 34 with respect to the housing 38; thus the neutral position of the spool 36 of the valve 12 is adjusted.

Thus, the neutral position of the valve 12 can be adjusted without dismantling the actuator 10 including the yoke member 80, the retainer member 52, the piezoelectric element 50 and so on, maintaining the preloading condition of the piezoelectric element undisturbed.

The performance of the piezoelectric element will be much degraded due to internal heat generation if it is used over a long time without proper cooling. Therefore, the cooling is necessary to ensure the correct operation of the piezoelectric actuator over a long period. In the embodiment shown in FIGS. 1-6, the operating fluid is fed from the return passage 24 through the passage 42 into the housing 38, and then this operating fluid is fed into the region around the piezoelectric element 50 by the fluid flow separator 162, and then flows from this region through the passage 44 to the return passage 26; the piezoelectric element 50 is thus cooled, and the correct operation of the actuator over a long period is ensured, with improved durability.

Figure 7:
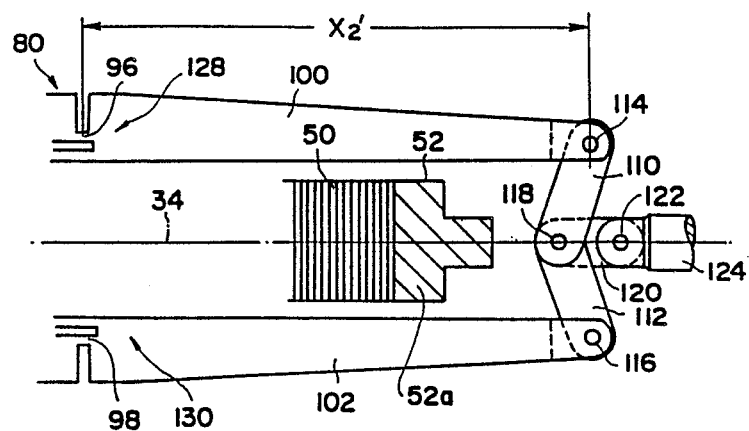
FIG. 7 is an explanatory partial vertical sectional view showing a modification of the actuator shown in FIGS. 1 to 6.

FIG. 7 is an explanatory partial vertical sectional view showing a modification of the actuator shown in FIGS. 1 to 6. In FIG. 7, the portions which are substantially the same as those shown in FIGS. 1 to 6 are indicated by the same reference numerals as in those figures.

In this embodiment, the links 110 and 112 are provided as inclined toward the piezoelectric element 50 from their outer ends toward their inner ends, in a reversed manner as compared with the structure shown in FIG. 2. Therefore, if the dimensions of all the other elements except the arm portions 100 and 102 are the same as in the embodiment shown in FIGS. 1 to 6, the effective arm length X2' of the arm portions 100 and 102 can be made longer than in the case of the embodiment shown in FIGS. 1 to 6, and therefore the displacement magnification ratio of the first displacement magnification mechanisms 128 and 130 can be increased. However, it will be noted that the direction of the axial movement of the valve spool 36 is opposite to that in the structure shown in FIG. 2 for the same expansion or contraction of the piezoelectric element 50.

Figure 8:
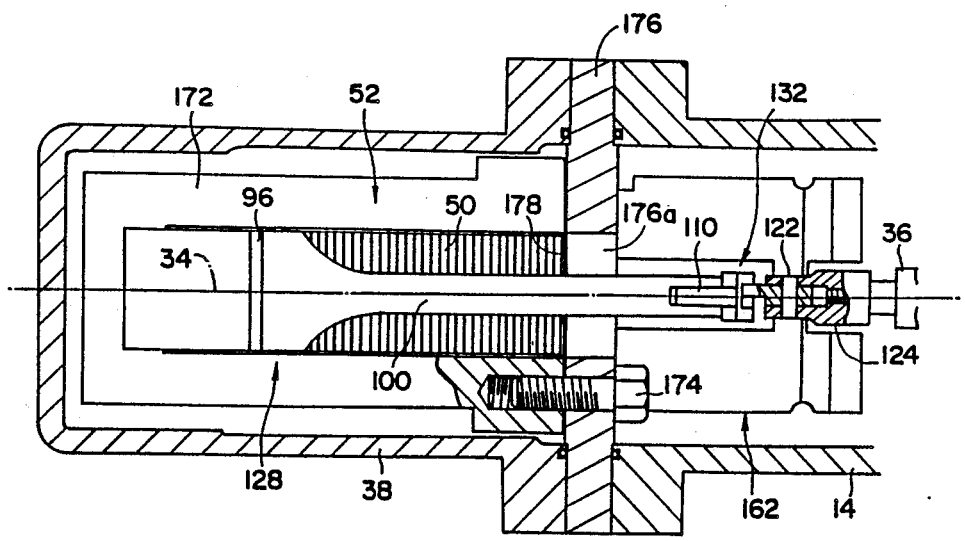
FIG. 8 and FIG. 9 are somewhat schematic longitudinal plan and vertical sectional views of another embodiment of the piezoelectric actuator according to the present invention.
Figure 9:
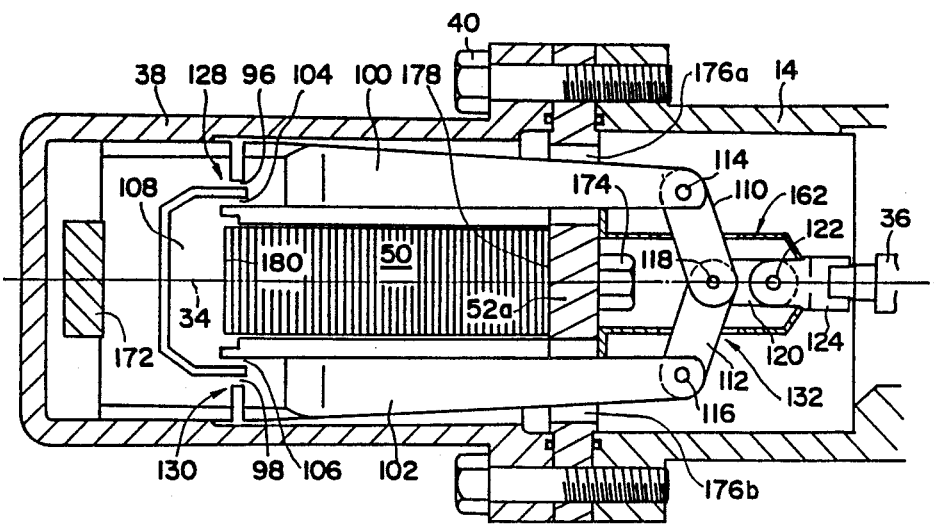

FIG. 8 and FIG. 9 are somewhat schematic longitudinal plan and vertical sectional views of another embodiment of the piezoelectric actuator according to the present invention. In these figures, the portions corresponding to those shown in FIGS. 1 to 6 are given the same reference numerals as in FIGS. 1 to 6.

In this embodiment, the retainer member 52 comprises a U-shaped main body 172 and a plate member 176 assembled together by bolts 174; the plate member 176 being formed with openings 176a and 176b while leaving a central portion 52a to support one end of the piezoelectric element 50. The outer peripheral portion of the plate member 176 is clamped between a flanged end of the valve housing 14 and a flanged end of the housing 38 by bolts 40. A shim 178 is provided between the central portion 52a and the end of the piezoelectric element 50 supported thereby; another shim 180 is provided between the other end of the piezoelectric element and the movable stay portion 108 of the yoke member 80. Therefore, in this embodiment, by selecting the thickness of these shims appropriately, the preloading on the piezoelectric element can be adjusted. Although not shown in FIGS. 8 and 9, by incorporation of an appropriate shim at the clamping portion between the valve housing 14 and the plate member 176, an adjustment may be made to the neutral position of the output member and the valve spool not shown.

Figure 10:
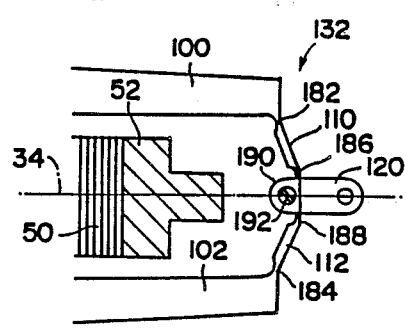
FIG. 10 is an explanatory partial vertical sectional view of another embodiment of the second displacement magnification mechanism of the piezoelectric actuator according to the present invention.

FIG. 10 is a partial vertical sectional view of another embodiment of the second displacement magnification mechanism 132 of the piezoelectric actuator according to the present invention. In FIG. 10, the portions corresponding to those shown in FIGS. 1 to 6 are given the same reference numerals as in FIGS. 1 to 6.

In this embodiment, the links 110 and 112 are formed as integral extensions of the tip end portions of the arm portions 100 and 102 integrally connected therewith via integral elastic hinges 182 and 184, and further to be integral with one another via a plate portion 190 via integral elastic hinges 186 and 188 disposed therebetween. The plate portion 190 is forming a part of the output member 120 as clamped by a machine screw 192. In this embodiment also, the pair of link portions may be inclined in the same way as in the modification shown in FIG. 7.

Figure 11:
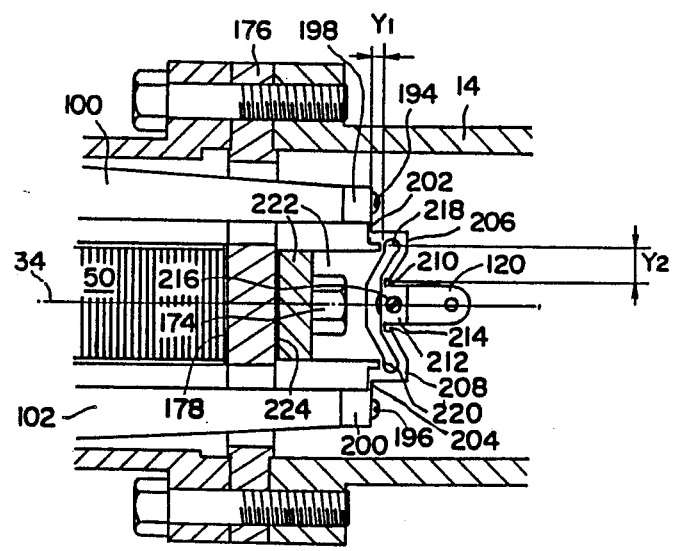
FIG. 11 is an explanatory partial vertical sectional view showing a modification to the second displacement magnification mechanism of the piezoelectric actuator shown in FIG. 8 and FIG. 9.

FIG. 11 is a partial vertical sectional view showing still another modification to the second displacement magnification mechanism 132 of the piezoelectric actuator shown in FIG. 8 and FIG. 9. In FIG. 11, the portions substantially the same as those shown in FIG. 8 and FIG. 9 are given the same reference numerals as in FIG. 8 and FIG. 9.

In this embodiment, an integral element as described hereinunder is provided; the integral element has a pair of opposite mounting end portions 198 and 200 fixed to the tip ends of the arm portions 100 and 102 by machine screws 194 and 196; these mounting end portions are integrally connected with L-shaped link portions 206 and 208 via integral elastic hinges 202 and 204, respectively; the link portions 206 and 208 are integrally connected at other ends thereof with a plate portion 214 via integral elastic hinges 210 and 212. The plate portion 214 is forming a part of the output member 120 as clamped by a machine screw 216. The integral element further includes a central base portion 222 integrally connected with the link portions 206 and 208 at middle portions thereof via integral elastic hinges 218 and 220. The central base portion 222 is fastened to the plate member 176 and the U-shaped main body 172 of the retainer member as in FIGS. 8 and 9 by bolts 174 of the same function as in FIGS. 8 and 9 with interposition of a shim 224 between the base portion 222 and the plate member 176, thus allowing adjustment of the neutral position of the aforementioned valve spool.

Therefore, in this embodiment, the link portions 206 and 208 pivot about the integral elastic hinges 218 and 220. Denoting the effective arm length between the integral elastic hinges 202 and 204 and the integral elastic hinges 218 and 220 in a direction parallel with the central axis 34 by Y1 and the effective arm length between the integral elastic hinges 218 and 220 and the integral elastic hinges 210 and 212 in a direction perpendicular to the central axis 34 by Y2, then the transverse displacement of the tip ends of the arm portions 100 and 102 is converted into a corresponding axial displacement of the output member 120 at a multiplying factor of Y2/Y1.

Although the present invention has been described in detail with respect to some preferred embodiments thereof, it will be apparent to those skilled in the relevant art that the present invention is not restricted to these embodiments and that various other embodiments and modifications are possible within the scope of the present invention.

We claim:

1. A piezoelectric actuator comprising an output member to reciprocate along a central axis, a piezoelectric element aligned substantially along said central axis, a retainer structure supporting a first end of said piezoelectric element, a first displacement magnification mechanism having a pair of arms each having a first end and a second end and pivotably supported on said retainer structure at an intermediate portion thereof via an elastic integral hinge, said first ends of said arms each abutting a second end of said piezoelectric element opposite to said first end thereof, a second displacement magnification mechanism having a pair of links pivotably connected at first ends thereof respectively with said second ends of said arms and pivotably connected with said output member at second ends thereof opposite to said first ends thereof, a housing enclosing said retainer structure with said first displacement magnification mechanism, and means for adjustably fastening said retainer structure to said housing so that said retainer structure is adjustably shiftable relative to said housing along said central axis, wherein said housing is a substantially cylindrical housing having a longitudinal axis aligned with said central axis.

2. A piezoelectric actuator according to claim 1, wherein said arms extend substantially along said piezoelectric element.

3. A piezoelectric actuator according to claim 1, wherein said pair of arms and said pair of links are disposed substantially mutually symmetrically about said central axis.

4. A piezoelectric actuator according to claim 1, wherein said pair of links are connected with said arms by pivots.

5. A piezoelectric actuator according to claim 1, wherein said pair of links are connected with said arms by elastic integral hinges.

6. A piezoelectric actuator according to claim 1, wherein each of said links expands an acute angle between a longitudinal center line thereof and said central axis on one side thereof facing toward said piezoelectric element.

7. A piezoelectric actuator according to claim 1, wherein each of said links expands an acute angle between a longitudinal center line thereof and said central axis on one side thereof facing away from said piezoelectric element.

8. A piezoelectric actuator according to claim 1, wherein said pair of links are pivotably supported at intermediate portions thereof from said retainer structure, said intermediate portions being displaced for an axial arm length from the pivotal connections between said second ends of said arms and said first ends of said links in a direction parallel to said central axis and for a transverse arm length larger than said axial arm length from the pivotal connections between said second ends of said links and said output member in a direction perpendicular to said central axis.

9. A piezoelectric actuator according to claim 8, wherein said links are pivotably supported from said retainer structure at said intermediate portions via integral elastic hinges.

10. A piezoelectric actuator according to claim 1, wherein said pair of links are pivotably connected at said second ends thereof with a common integral element via integral elastic hinges, said common integral element forming a part of said output member.

11. A piezoelectric actuator according to claim 1, wherein said first displacement magnification mechanism comprises an integral yoke member having a base portion of a generally U-shape having opposite leg portions arranged symmetrically on opposite sides of said central axis, a pair of arms extending symmetrically on opposite sides of said central axis substantially in parallel thereto to have first and second end portions expanding an effective arm length therebetween and integrally connected at said first end portions thereof with transversely innermost edge portions of axial end portions of said leg portions of said base portion via a pair of first integral elastic hinge portions integrally connected with said first end portions of said arm portions via a pair of second integral elastic hinge portions displaced from said first pair of integral elastic hinge portions for a distance much smaller than said effective arm length toward said central axis and adapted to support said second axial end of said piezoelectric element.

12. A piezoelectric actuator according to claim 11, wherein said yoke member has a generally U-shaped longitudinal section as a whole when viewed in a phantom plane extending along said central axis with said base portion and said first end portions of said pair of arm portions being separated by a pair of slits cut transversely from opposite side edges of said generally U-shaped longitudinal section inwardly toward said central axis so far as to leave said pair of first integral elastic hinge portions and with said base portion and said movable stay portion being separated by a slit of a generally U-shape when viewed in said phantom plane, opposite end portions of said generally U-shaped slit defining said first and second integral elastic hinge portions on opposite sides thereof.

13. A piezoelectric actuator according to claim 12, wherein said opposite ends of said generally U-shaped slit extend beyond said pair of transverse slits with regard to axial positions thereof along said central axis.

14. A piezoelectric actuator according to claim 11, wherein said retainer structure comprises a bifurcated retainer member including a root portion and a pair of leg portions extending therefrom, said retainer member supporting said first end of said piezoelectric element at said root portion thereof and being firmly clamped at tip end portions of said pair of leg portions thereof with said base base portion of said yoke member, said pair of leg portions thereof being angularly displaced relative to said pair of arm portions of said yoke member about said central axis so that said leg portions of said retainer member and said arm portions of said yoke member extend alternately about said piezoelectric element.

15. A piezoelectric actuator according to claim 14, further comprising a means for angularly anchoring said yoke member relative to said housing so as not to rotate in said housing relative thereto while allowing an axial adjust movement of said yoke member relative to said housing.

16. A piezoelectric actuator according to claim 14, wherein said means for adjustably fastening said retainer structure to said housing also adjustably fastens said yoke member to said housing and includes a shaft portion extended from said root portion of said yoke member with a male thread formed therearound, a nut removably mounted to an open end portion of said cylindrical housing with a female thread thereof engaging with a corresponding male thread formed on an outer surface portion of said open end portion of said housing, a disk member having an outer rim portion adapted to be clamped between an end face of said open end portion of said housing and said nut and a central hub portion formed with a threaded opening to engage with said male thread of said shaft portion, and a lock nut mounted on said male shaft portion to be clamped against said hub portion for locking up relative rotation between said disk member and said shaft portion.

* * * * *